INVENTORS:
KONRAD BUNGE, OTTO KOCH.
BY Connolly and Hutz
their ATTORNEYS

July 12, 1966  K. BUNGE ETAL  3,260,850
MEASURING THE WATER CONTENT OF PHOTOGRAPHIC LAYERS
Filed March 13, 1963  2 Sheets-Sheet 2

INVENTORS:
KONRAD BUNGE, OTTO KOCH.
BY
ATTORNEYS

United States Patent Office 3,260,850
Patented July 12, 1966

3,260,850
MEASURING THE WATER CONTENT OF
PHOTOGRAPHIC LAYERS
Konrad Bunge and Otto Koch, Cologne-Stammheim, Germany, assignors to Farbenfabriken Bayer Aktiengesellschaft, Leverkusen, Germany, a corporation of Germany
Filed Mar. 13, 1963, Ser. No. 264,975
Claims priority, application Germany, Apr. 6, 1962, F 36,483
4 Claims. (Cl. 250—219)

The invention relates to an apparatus for continuously measuring the water content of photographic layers in the production of photographic films.

Photographic films are generally composed of one or more photosensitive layers and various auxiliary layers.

Particularly in modern colour films, the layers have to be poured with great accuracy because the quantity of silver halide applied per square meter must lie within very narrow tolerance limits of about 1 to 2%. When measuring the silver content for the purpose of controlling the casting of the layer, difficulties arise with films composed of several layers since the silver of the underlying emulsion layers is also measured. To determine the amount of silver applied, one would therefore have to know the amount of silver halide in the underlying layers and subtract this value from the result measured. However, this method is not sufficiently accurate, particularly in the case of colour films composed of several layers.

In principle, it would be possible to determine the silver content indirectly by measuring the water applied when pouring the layers. Provided the underlying layers contain only negligible quantities of water, the quantity of silver applied could then be calculated from the known proportions of water and silver.

However, the known photometers that are used, for example, for determining the water content in foils, cannot be used for this purpose. The determination of the water concentration is carried out with the known instrument for example as follows:

Two beams of light rays of wavelength $1.95\mu$ and wavelength of, for example, $1.8\mu$ are produced by an optical arrangement and the extinctions of the foil at these wavelengths are compared. At the wavelength $1.95\mu$, there is a water absorption band whereas at $1.8\mu$ water absorbs only to a negligible amount. Provided that the foil which is free from water has the same extinction at the two wavelengths a value is obtained is proportional to the water concentration in the film. This process operates correctly only when the extinction of the dry base substance is the same at the measuring wavelength and the comparison wavelength.

Instruments as described above are unsuitable for the determination of water in photographic layers because the light-sensitive layers have a scattering power which is dependent upon the wavelength. To this is added the fact that light-sensitive or auxiliary layers already present, for example, antihalo layers or adhesive layers as well as the support of the layers influence the measurement in the spectral region under consideration to a greater or lesser extent by scattering or absorption. In this connection, it should be mentioned that owing to the light-sensitivity of the photographic materials, only rays from the infrared region may be used for the measurements. In addition, these interfering scatterings and absorptions are dependent on wavelength. The measurement of the water application using the known instruments would therefore be influenced not only by the water- and silver content of the layer that is to be measured and its behaviour to scattering but also by the similar properties of all underlying layers as well as by the position of the layer being measured relative to the optical means of the measuring device.

We now have found that the water content can be measured by suitable choice of the measuring and reference wavelengths with the aid of a special optical instrument.

Figure 2A:
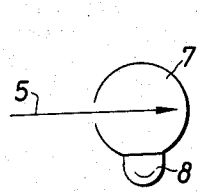
FIGS. 2a and 2b are schematic views of one embodiment of the optical means shown in FIG. 1.
Figure 2B:
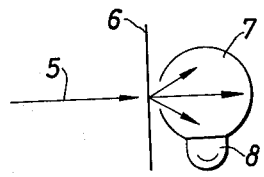
Figure 3A:
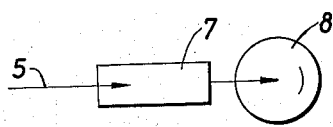
FIGS. 3a and 3b are schematic views of another embodiment of the optical means shown in FIG. 1.
Figure 3B:
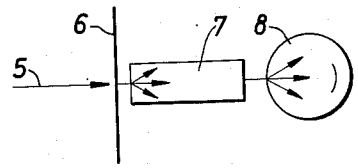
Figure 4A:
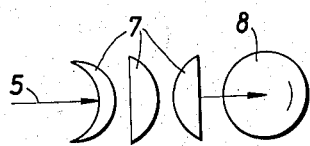
Figure 4B:
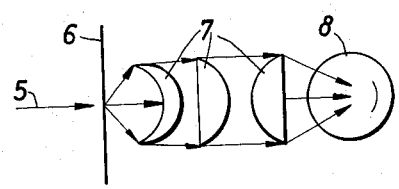
Figure 5A:
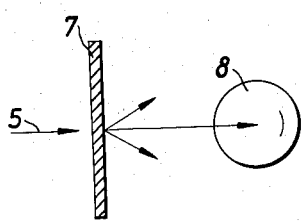
Figure 5B:
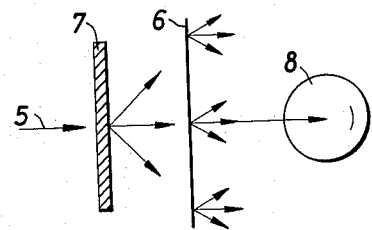

FIGS. 4a and 4b are schematic views of the optical means of FIGS. 2a and 2b respectively, divided into a plurality of optical lenses; and FIGS. 5a and 5b are schematic views similar to FIGS. 3a and 3b respectively, wherein the optical means is in the form of a scattering device.

Figure 1:
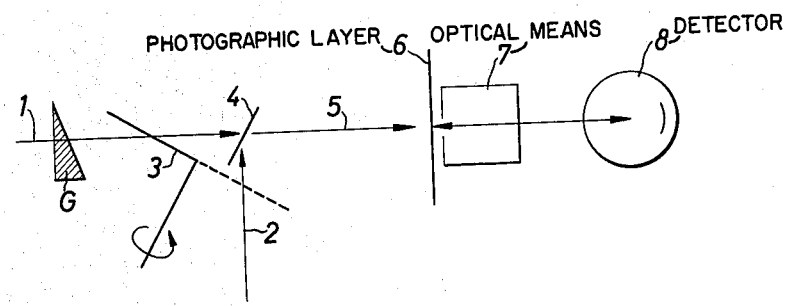
FIG. 1 is a schematic view of one embodiment of this invention.

The apparatus according to the invention is shown diagrammatically in FIGURE 1, which illustrates a means for passing two rays of light, a measuring wavelength 1 and a reference wavelength 2 through a photographic layer 6 in order to determine the water content of the latter; the elements of the apparatus can be broken down basically to a rotating interrupter 3, a semitransparent mirror 4 which unites wavelengths 1 and 2 into a combined beam 5, a photoelectric detector 8, and an optical means 7 in the path thereof to prevent scattering of the light beam 5 after the latter has passed through photographic layer 6 and before it reaches detector 8. Wedge G may be used to control beam 1 as further described below.

FIGURES 2a and 2b illustrate one embodiment of optical means 7 in which it is combined with detector 8 in the form of an integration sphere 7, 8. FIGURE 2a shows the path of ray 5 without photographic layer 6 being interposed in its path; FIGURE 2b illustrates the scattering effect which results when a water-containing photographic layer 6 is inserted in the path of beam 5.

FIGURES 3a and 3b show another embodiment of optical means 7 of FIGURE 1 wherein that element is a fiber optic. As in the case of FIGURES 2a and 2b, FIGURE 3a shows the path of the ray 5 without photographic layer 6 interposed therein, whereas FIGURE 3b illustrates the patern of ray 5 when a water-containing photographic layer 6 is introduced into its path.

FIGURES 4a and 4b describe a sub-division of the embodiment of FIGURES 2a and 2b respectively wherein optical means 7 is divided into a plurality of optical lenses which are adapted to receive and transmit rays having a wide angle of propagation as they emerge from photographic layer 6.

FIGURES 5a and 5b illustrate simply another version of FIGURES 3a and 3b respectively wherein optical means 7 takes the form of a scattering disc which diffuses the light ray 5 in a manner which obviates any change in the distribution of light when the layer is introduced (FIGURE 5b) as compared to the pattern of beam 5 before photographic layer 6 is introduced (FIGURE 5a).

The operation of the apparatus, referring to FIGURE 1, is as follows:

Two beams of light are produced, one (1) at a wavelength (measuring wavelength) at which water absorbs, the other (2) at a standard or reference wavelength used for comparison. With the aid of the rotating interrupter 3, the beams are conducted to the semitransparent mirror 4 which unites them into one beam 5. This beam passes through the support carrying the layer 6 that is to be measured. Near this layer, optical means 7 according to the invention are provided, the action of which will be discussed later. Finally, the light beam 5 reaches the photoelectric detector 8 which emits a signal proportional to the momentary power of light. The measuring value is obtained by comparison of the signal being emitted by the photoelectric detector (e.g. a photocell known per se) during the time interval when the measuring ray which is partially absorbed by the water of the layer falls on to the cell with the signal which is emitted during the time interval when the ray of the reference wavelength falls onto the photocell. Another embodiment comprises a gray wedge (G) in the beam 1 which allows one to control that beam until the signals leaving the photoelectric detector are the same for both paths of rays. Thus the measuring value can be read by the gray wedge. The absorption of the measuring value indicates directly the water content or thickness of the layer. According to another embodiment the water content or thickness of the layer can be obtained by comparing the measuring value with a calibration curve showing the interrelation between, for example, the thickness of the layer and measured values.

When there is no layer in the path of the rays in the apparatus according to the invention, each of the two paths provides a certain light input to the photoelectric detector. If the carrier of the film 6 which is covered with the photosensitive layer to be measured and may also be covered with other layers which have a negligible water content is introduced into the path of the rays, the light output in each path is considerably reduced, but the reduction factor is the same for both paths. If, in addition, a water-containing layer of the required thickness is now applied, only the light input from the measuring rays will now change substantially, the change being proportional to the concentration of water. The wavelength of the measuring ray 1 used in the arrangement according to the invention is $1.95\mu$ and that of the comparison ray 2 lies between about 1.7 and $1.8\mu$. The reason for this choice of wavelength is that in the region of about 1.7 to $2.0\mu$, the extinction of the dry layers in question varies only to a negligible extent.

The scatter characteristic of the layers behaves rather differently in this range of wavelengths. It is found that this property is dependent upon the wavelength to such an extent that it is not possible to obtain a sufficiently accurate measurement without taking special measures.

The essence of the invention lies in altering the scatter characteristic by suitable optical means 7 which do not impair the measurement of the water content. These optical means must have the effect that the radiation reaching the photoelectric detector 8 must depend as little as possible on the angle at which the rays leave the area of the layer to be measured. Various alternative optical means are shown in FIGURES 2 to 5. In each case, part (a) of the figure shows the path of the rays without the object to be measured and the part (b) shows the path of the rays when the water-containing photographic layer was introduced.

In FIGURE 2, for example, the optical means consist of an integration sphere 7 placed behind the layer 6. If the layer 6 to be measured is now introduced into the free path of the rays, there will be a change in the distribution of the rays entering the sphere 8, but the output reaching the photoelectric detector 8 will not be altered. This is true for each of the two paths of rays.

FIGURES 3 and 4 show further embodiments of the optical means 7. In the arrangement of FIGURE 3, a fiber optic is used, and in the arrangement of FIGURE 4, an optical system is used which can receive an extremely large solid angle of the rays leaving the layer 6. The effect of the arrangements of FIGURES 3 and 4 is the same as that of arrangement of FIGURE 2. The feature common to all three embodiments is that they receive as much as possible of the light leaving the layer.

Another embodiment is shown in FIGURE 5 in which a scattering disc is arranged close to the layer to be measured. It produces ideal diffusion of light so that there can be no further change in the distribution of light when the layer is introduced. If desired, the scattering disc may equally well be placed behind the layer instead of in front of it.

In each of the arrangements described above, the introduction of a moist layer produces the same change in the light output reaching the photoelectric detector as in the known arrangements. These changes in light output can therefore be used in known manner for measuring the water concentration.

The discovery that the errors introduced by the scatter charactetristic of the layer being dependent on the wavelength may be eliminated by purely optical means is particularly surprising for the expert because the water-containing layers produce not only a forward scatter but also a considerable back scatter.

It should be pointed out here that the accompanying drawings illustrate the embodiments of the invention only diagrammatically. When constructing a measuring apparatus in practice, the size and construction of the apparatus and of the individual elements may easily be adapted to the individual requirements. For example, the integration sphere (Ulbricht sphere) may be arranged at a certain safety distance of a few millimetres from the film. Although it will then not take up all the rays from the layer, the error thereby produced will be so slight that it does not affect the measurement.

The said optical means should be arranged at a distance of 1–50 mm. preferably 2–10 mm. from the photographic film to be measured.

The degree of accuracy which can be obtained with the apparatuses according to the invention is about $\pm 1\mu$ thickness of water layer.

Any photographic mono- or multilayer material can be measured with an apparatus according to the invention, the composition of the silver halides or any other usual ingredients are not critical.

We claim:
1. In an apparatus for continuously measuring the water content of photographic layers in the production of photographic films which apparatus comprises a device for producing a beam of light rays of a wavelength of $1.95\mu$ for measuring the water content, a device for producing a second beam of light rays of a reference wavelength lying between 1.7 and $1.8\mu$, these beams penetrating the water-containing layer to be measured substantially at the same point, and a photoelectric detector which is arranged behind the object to be measured and which compares the light output of the two rays of light, the improvement which comprises arranging between the photographic layer to be measured and the said photoelectric detector an optical means capable of receiving substantially all of the radiation coming in the half space between the photographic layer to be measured and the photoelectric detector and capable of passing on at least a part of said received radiation, said received radiation being independent of the angle distribution of the radiation leaving the photographic layer and having sufficient intensity for releasing a measurable signal of the said photoelectric detector.

2. The apparatus of claim 1 wherein the optical means consists of an integration sphere.

3. The apparatus of claim 1 wherein the optical means consists of a fiber optic.

4. The apparatus of claim 1 wherein the optical means consists of an optical lens system capable of receiving an extremely large solid angle of the rays leaving said photographic layer.

References Cited by the Examiner

UNITED STATES PATENTS

| | | | |
|---|---|---|---|
| 1,991,599 | 2/1935 | Davis | 88—14 |
| 2,196,166 | 4/1940 | Bryce | 250—226 X |
| 3,153,722 | 10/1964 | Bayly et al. | 250—226 X |

RALPH G. NILSON, *Primary Examiner.*

WALTER STOLWEIN, *Examiner.*

J. D. WALL, *Assistant Examiner.*